Feb. 7, 1950     H. M. REEVES     2,496,750
COOKSTOVE
Filed Oct. 19, 1945
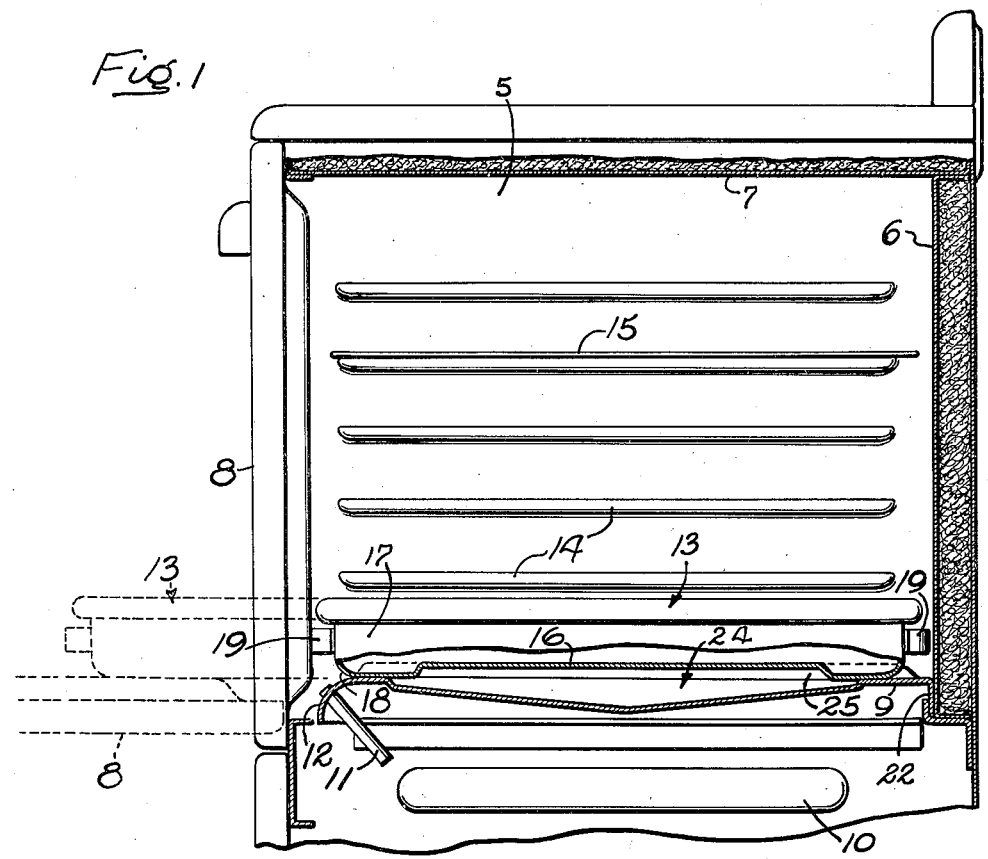
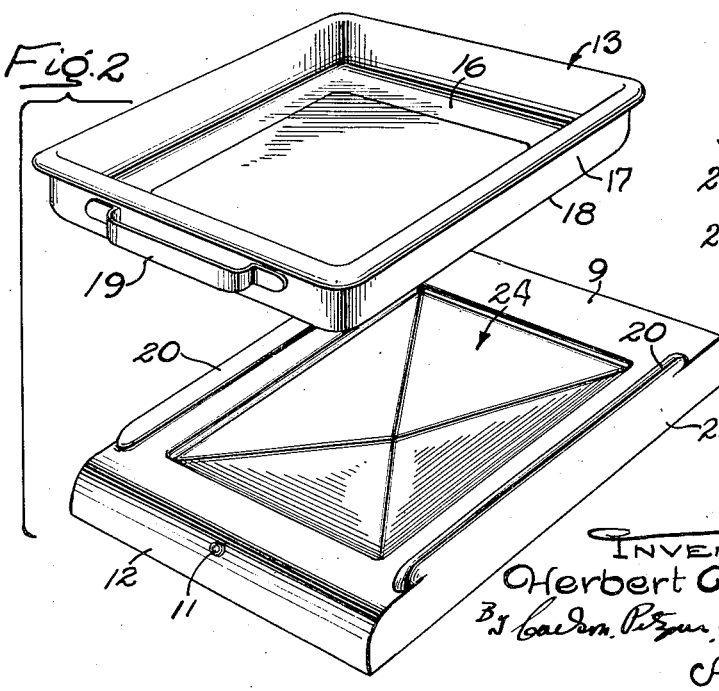
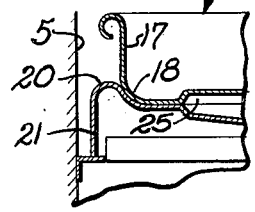
INVENTOR
Herbert M. Reeves
ATTORNEYS Patented Feb. 7, 1950

2,496,750

UNITED STATES PATENT OFFICE 2,496,750

COOKSTOVE

Herbert M. Reeves, Kankakee, Ill., assignor to Florence Stove Company, Gardner, Mass., a corporation of Massachusetts Application October 19, 1945, Serial No. 623,379

2 Claims. (Cl. 126—22)

The invention pertains to gas cookstoves and the like and has for its general aim the improvement of the so-called baking oven for roasting purposes to the end that the utility of the oven may be increased.

The common practice in the construction of roasting and baking ovens is to make the bottom wall of the oven from two thin sheets of metal with an insulating air space therebetween, so as to provide for the proper transmission and distribution of heat from the underlying burner to the oven when the oven is used for baking purposes. The primary object of the present invention is to provide a roasting pan as a unitary part of the oven, adapted to rest on a single sheet or plate forming the bottom of the oven, and performing the function of the upper sheet of the conventional bottom construction when the oven is used for baking purposes, the pan being adapted to be supported alternatively upon the usual rack supports in the oven so as to be positioned at any desired elevation when the oven is used for roasting purposes.

Another object is to provide an oven compartment especially constructed for the accommodation of a roasting pan.

The objects of the invention thus generally set forth, together with other and ancillary advantages, are attained by the construction and arrangement shown by way of illustration in the accompanying drawings, in which:

Figure 1 is a vertical sectional view through an oven compartment of a cookstove embodying my invention, a portion of the top wall of the oven compartment being shown in section.

Fig. 2 is a perspective view showing the roasting pan in detached relation to the bottom plate of the oven compartment and illustrating in particular the construction of the oven bottom plate for receiving and positioning the pan.

Fig. 3 is a fragmentary transverse sectional view showing the interfitting relation between the pan and the bottom plate.

My invention is herein shown applied to a gas cookstove having an oven compartment with opposed side walls 5 (one only being shown), a rear wall 6, a top wall 7, and a front opening closed by a door 8. The bottom of the compartment is formed by a bottom plate 9 secured in fixed relation to the side and rear walls of the compartment in any suitable or preferred manner, and underlying the bottom plate is a conventional gas burner 10. A lighter tube 11 extends upwardly from the region immediately above and forwardly of the burner through the front depending flange 12 of the bottom plate.

My invention resides in the provision of a roasting pan 13 so proportioned as to be capable of resting upon the bottom plate 9 of the oven without interfering with the use of other utensils supported in elevated position in the oven in the usual way for baking purposes. Thus, the roasting pan is made relatively shallow, it being dimensioned vertically with respect to the lowermost series of guide members 14 on the side walls of the oven upon which the conventional oven rack 15 is removably supported. Accordingly, the roasting pan is accommodated in the lower portion 14 of the compartment so as to be receivable therein without interference with the rack 15 even though the latter is supported upon the lowermost guide members 14. Additionally, the bottom plate 9 of the oven is especially constructed so as to receive and retain the roasting pan in proper spaced relation to the side and rear walls of the oven while at the same time providing guide means whereby the pan may be removed easily from the oven compartment and replaced therein.

As shown, the pan comprises a bottom wall formed by a plate 16 and upright side walls 17 joined to the edges of the bottom plate preferably by rounded corner portions 18. Its forward and rear walls are equipped with handles 19.

The bottom plate 9 of the oven compartment is provided with guide members preferably in the form of integral ribs 20 disposed along the opposite side edges of the plate which is formed with depending opposite side flanges 21, a rear flange 22 and the curved front flange 12, the latter being apertured to receive the lighter tube 11. As best shown in Fig. 3, the ribs 20 are complementally shaped with respect to the corner portions 18 of the pan so that the latter is in effect fitted to the bottom plate and held by the latter with the side walls 17 in uniformly spaced relation to the opposite side walls 5 of the compartment. The rear handle 19 of the pan is engageable with the rear wall 16 of the upper compartment to hold the pan in spaced relation thereto, the pan being dimensioned in a front-to-rear direction so that the front handle of the pan is disposed sufficiently rearward of the door opening to permit closure of the door 8.

Inasmuch as the bottom plate 9 of the oven compartment directly overlies the burner 10, it is desirable to provide an insulating air space between it and the bottom of the pan. Preferably, this air space is so dimensioned as to be of greater depth centrally of the plate. It is provided in the present instance by forming a central depression or recess 24 disposed centrally of the bottom plate and sloping upwardly from the center laterally as well as in a front-to-rear direction. Additionally, the bottom plate 16 of the pan is shown as provided with an oppositely depressed portion or recess 25 of lateral and longitudinal dimensions preferably slightly less than that of the recess 24 in the bottom plate 9 so as to form a rectangular well about the central portion for collecting juices etc., for basting purposes. The insulating air space thus provided tends to insure distribution of heat uniformly over the bottom of the pan.

In the use of the oven for baking purposes, the pan 13 is placed in position at the bottom of the oven and in overlying relation to the bottom plate 9 so that the pan performs the function of the upper plate or sheet in the conventional oven construction. Because of the limited depth of the pan it does not, when resting upon the bottom plate 9, interfere with the support of baking utensils upon the oven rack even though the latter rests upon the lowermost guide members 14. For roasting purposes, the pan 13 need not rest upon the bottom plate 9 but may be supported at any desired elevation in the oven through the medium of the conventional rack 15. As a result, the pan is adapted to perform the function both of a top plate for the oven bottom when the oven is used for baking, and as a container or receptacle for roasting purposes.

I claim as my invention:

1. In a cookstove having an oven compartment, a sheet metal plate forming the bottom of the oven, a burner underlying said bottom plate, said plate being formed with a generally rectangular depression bordered on all sides by a flat marginal portion disposed in a horizontal plane, a sheet metal pan having upright side walls joined to a generally flat bottom wall by rounded corner portions, said bottom wall serving when resting on the flat marginal portion of said plate to form therewith an insulating air space between said burner and the oven, said bottom wall having its central portion offset upwardly to form a rectangular liquid collecting well about the central portion of the pan and to increase the thickness of said insulating air space, and guide members on said plate complementally shaped with respect to the corner portions of said pan and engageable therewith to hold the pan in a predetermined position within the oven.

2. In a cookstove having an oven compartment, an imperforate sheet metal plate forming the bottom of the oven, a burner underlying said bottom plate, said bottom plate having a central generally rectangular depression bordered by a continuous flat marginal portion extending around the four sides of said depression and disposed in a horizontal plane, a sheet metal roaster pan having imperforate upright side walls of substantial height and a bottom wall having flat marginal edge portions adapted to rest on the flat marginal edge portion of said bottom plate to form a completely closed space between said bottom plate and said pan, the bottom wall of said pan having its central portion offset upwardly to form a liquid collecting well about the central portion of the pan and to increase the thickness of the closed space between the said bottom plate and said pan when said pan is resting on said bottom plate, means for holding said pan substantially centered with respect to the depression in said plate, and means within the oven compartment for supporting the pan in various positions above said bottom plate.

HERBERT M. REEVES.

REFERENCES CITED

The following references are of record in the file of this patent:

UNITED STATES PATENTS

| Number | Name | Date |
|---|---|---|
| 1,079,356 | Maul | Nov. 25, 1913 |
| 1,096,200 | Seate | May 12, 1914 |
| 1,296,209 | O'Dowd | Mar. 4, 1919 |
| 1,310,872 | Mott | July 22, 1919 |
| 1,356,102 | Wilcox | Oct. 19, 1920 |
| 1,383,256 | Cooper | Jan. 28, 1921 |
| 1,432,950 | Bell | Oct. 24, 1922 |
| 1,776,929 | Reedy | Sept. 30, 1930 |
| 1,980,307 | Wilkinson et al. | Nov. 13, 1934 |
| 2,358,034 | Schweller et al. | Sept. 12, 1944 |

FOREIGN PATENTS

| Number | Country | Date |
|---|---|---|
| 9,465 | Great Britain | Aug. 10, 1888 |
| 188,576 | Switzerland | Jan. 15, 1937 |
| 342,836 | Germany | Oct. 24, 1921 |